3,254,032
LONGWAVE LIGHT-EMITTING ZINC SULFIDE PHOSPHORS
Anselm Wachtel, Sayreville, N.J., assignor to Westinghouse Electric Corporation, East Pittsburgh, Pa., a corporation of Pennsylvaina
No Drawing. Filed July 13, 1962, Ser. No. 209,752
9 Claims. (Cl. 252—301.6)

This invention relates to phosphor compositions and, more particularly, to phosphor compositions which are both photoluminescent and electroluminescent.

Copper-activated, zinc sulfide electroluminescent phosphors are well known and are normally used in electroluminescent devices when a blue to green emission is desired. The addition of manganese activator to such a phosphor will shift the overall emission toward the yellow. Other electroluminescent phosphors having emissions in the longer wave-length regions of the visible spectrum are known, but such phosphors all have commercial drawbacks.

Phosphors which are excited by ultraviolet radiations, in order to produce visible radiations, are known as photoluminescent phosphors. Photoluminescent phosphors which emit primarily in the longer wavelength regions of visible spectrum are useful in discharge devices and other similar applications.

It is the general object of this invention to provide a phosphor composition having an emission which is peaked in the longer wavelength regions of the visible spectrum.

It is another object to provide a photoluminescent phosphor composition having an emission which is peaked in the longer wavelength regions of the visible spectrum.

It is a further object to provide an electroluminescent phosphor composition having an emission which is peaked in the longer wavelength regions of the visible spectrum.

The aforesaid objects of the invention, and other objects which will become apparent as the description proceeds, are achieved by providing a phosphor composition having a matrix principally comprising zinc sulfide and including copper, lithium, and titanium in activator proportions. The phosphor must be maintained substantially free from any halogen and also from any Group IIIA element. In preparing the phosphor composition, copper in compound form and lithium in compound form are added in predetermined amount with respect to the zinc sulfide matrix which is formed during firing, in addition to a predetermined amount of titanium in compound form. The phosphor raw mix is then fired in a hydrogen or hydrogen sulfide atmosphere, the resulting phosphor cooled, and then washed in a suitable solvent. As a possible alternative embodiment, other additional activators such as lanthanum, arsenic, cerium, gold, or platinum can be added to the phosphor, in order to improve the electroluminescent characteristics.

Considering the present phosphor in greater detail, the matrix principally comprises zinc sulfide. Small amounts of other Group IIB metals can be substituted for a part of the zinc, and selenium can be substituted for a part of the sulfur which forms the matrix. Copper activator is added in compound form to the raw mix in amount of from $5 \times 10^{-6}$ to $1 \times 10^{-2}$ gram atom per gram mole of zinc sulfide matrix formed during firing. This added copper compound should be substantially free from any halogen. Lithium is added to the phosphor raw mix in compound form substantially free from any halogen in amount of from $1 \times 10^{-4}$ to $1 \times 10^{-2}$ gram atom per gram mole of zinc sulfide matrix which is formed during firing. The titanium which is added to the phosphor raw mix is substantially all retained during the phosphor preparation and the titanium is present in the phosphor in amount of from $1 \times 10^{-6}$ to $1 \times 10^{-2}$ gram atom per gram mole of the zinc sulfide matrix.

If the phosphor is desired to be electroluminescent, the copper is added to the raw mix in amount of from $1 \times 10^{-4}$ to $1 \times 10^{-2}$ gram atom per gram mole of zinc sulfide matrix and the titanium is used in amount of from $1 \times 10^{-4}$ to $1 \times 10^{-2}$ gram atom per gram mole of the zinc sulfide matrix. If the phosphor is to be photoluminescent, the copper is added to the raw mix in amount of from $5 \times 10^{-6}$ to $1 \times 10^{-4}$ gram atom per gram mole of the zinc sulfide matrix and the titanium is added in amount of from $1 \times 10^{-6}$ to $1 \times 10^{-4}$ gram atom per gram mole of the zinc sulfide matrix. The amount of added lithium is the same whether the phosphor is intended to be photoluminescent or electroluminescent. In either case, some of the added lithium is vaporized during the firing.

First considering the embodiment of the present phosphor which is electroluminescent, finely divided zinc sulfide is mixed with $2 \times 10^{-3}$ gram atom of copper, added as the acetate, $2 \times 10^{-3}$ gram atom of lithium, added as the carbonate, and $5 \times 10^{-4}$ gram atom of titanium, added as the oxalate, with all added activator materials being expressed in terms of gram atoms per gram mole of zinc sulfide. The raw mix materials are placed into a silica boat and fired in a hydrogen sulfide atmosphere at a temperature of 950° C. for a period of one hour. Thereafter, the resulting phosphor is cooled, washed with a strongly alkaline 10% by weight aqueous solution of sodium cyanide, in order to remove excess cuprous sulfide, rinsed and dried. The cyanide wash is well known for such phosphors and its concentration can be varied. The resulting phosphor has a reddish electroluminescent response. Varying the copper content will vary the response somewhat, with higher copper shifting the response toward orange and lower copper shifting the response toward purple.

As a second example, the phosphor raw mix as given hereinbefore is modified in that copper as the acetate is added in amount of $2 \times 10^{-3}$ gram atom per gram mole of zinc sulfide. The phosphor is fired at a temperature of 1100° C. for a period of one hour in a hydrogen sulfide atmosphere. The resulting electroluminescent emission is reddish in color.

For best electroluminescent response, the copper concentration in the raw mix is from $2 \times 10^{-3}$ to $7 \times 10^{-3}$ gram atom per gram mole of zinc sulfide, and the titanium concentration is from $3 \times 10^{-3}$ to $7 \times 10^{-3}$ gram atom per gram mole of zinc sulfide in the phosphor matrix. The lithium concentration preferably is from $1 \times 10^{-3}$ to $3 \times 10^{-3}$ gram atoms of lithium in compound form, as added to the raw mix, per gram mole of zinc sulfide matrix formed during firing.

For preparing the embodiment of the present phosphor which is photoluminescent, the copper is compound form, such as the acetate, should be added to the raw mix in such amount as to provide from $5 \times 10^{-6}$ to $1 \times 10^{-4}$ gram atom of copper per gram mole of zinc sulfide matrix formed during firing. The lithium concentration is the same as for electroluminescent response, and preferably the lithium is added to the raw mix in compound form, such as the carbonate, in amount of from $1 \times 10^{-3}$ to $3 \times 10^{-3}$ gram atom per gram mole of zinc sulfide matrix formed during the firing. The titanium concentration permissibly is from $1 \times 10^{-6}$ to $1 \times 10^{-4}$ and preferably from $1 \times 10^{-5}$ to $3 \times 10^{-5}$ gram atom of titanium per gram mole of zinc sulfide matrix present in the phosphor. The titanium can be added to the raw mix as the oxalate or similar compound which on firing decomposes to the oxide.

Both the electroluminescent and photoluminescent response of the foregoing phosphors will vary with the activator concentrations, but will predominantly occur in the longer wavelength regions of the visible spectrum.

As a possible alternative embodiment, lanthanum can be added to the raw mix of the electroluminescent phosphor embodiment, in compound form such as the carbonate, in amount of from $1 \times 10^{-4}$ to $1 \times 10^{-2}$ gram atom per gram mole of zinc sulfide matrix in the phosphor. The preferred lanthanum addition is $1 \times 10^{-3}$ gram atom per gram mole of the zinc sulfide matrix. This increases the intensity of the electroluminescent longwave emission of the phosphor. Arsenic added in equivalent amounts will also enhance the electroluminescent emission, as will cerium, gold and platinum, although lanthanum has been found to be the best of these additives. All of these additive materials should be incorporated into the phosphor raw mix in the compound form which is free from halogen or any Group IIIA element.

The foregoing photoluminescent phosphor embodiment is also stimulated by infrared radiations to emit in the longer wavelength regions of the visible spectrum. In such a mode of excitation, the phosphor is first excited by ultraviolet radiations. Thereafter, upon excitation by infrared radiations, the phosphor emits a relatively intense red emission of appreciable duration.

It will be recognized that the objects of the invention have been achieved by providing a phosphor which is both photoluminescent and electroluminescent, depending upon the activator concentrations, with an emission which is predominantly peaked in the longer wavelength regions of the visible spectrum.

While best embodiments have been described hereinbefore, it is to be particularly understood that the invention is not limited thereto or thereby.

I claim as my invention:

1. A phosphor composition having a matrix consisting essentially of zinc sulfide and including copper, lithium, and titanium in activator proportions, and substantially free from any halogen and any Group IIIA element, copper in compound form substantially free from halogen having been included in the raw mix for said phosphor in amount of from $5 \times 10^{-6}$ to $1 \times 10^{-2}$ gram atom per gram mole of zinc sulfide matrix formed during firing, lithium in compound form substantially free from halogen having been included in the raw mix for said phosphor in amount of from $1 \times 10^{-4}$ to $1 \times 10^{-2}$ gram atom per gram mole of zinc sulfide matrix formed during firing, and titanium present in said phosphor in amount of from $1 \times 10^{-6}$ to $1 \times 10^{-2}$ gram atom per gram mole of the zinc sulfide matrix.

2. A photoluminescent phosphor composition having a matrix consisting essentially of zinc sulfide and including copper, lithium, and titanium in activator proportions, and substantially free from any halogen and any Group IIIA element, copper in compound form substantially free from halogen having been included in the raw mix for said phosphor in amount of from $5 \times 10^{-6}$ to $1 \times 10^{-4}$ gram atom per gram mole of zinc sulfide matrix formed during firing, lithium in compound form substantially free from halogen having been included in the raw mix for said phosphor in amount of from $1 \times 10^{-4}$ to $1 \times 10^{-2}$ gram atom per gram mole of zinc sulfide matrix formed during firing, and titanium present in said phosphor in amount of from $1 \times 10^{-6}$ to $1 \times 10^{-4}$ gram atom per gram mole of the zinc sulfide matrix.

3. A photoluminescent phosphor composition having a zinc sulfide matrix and activated by copper, lithium, and titanium, and substantially free from any halogen and any Group IIIA element, copper in compound form substantially free from halogen having been included in the raw mix for said phosphor in amount of from $5 \times 10^{-6}$ to $1 \times 10^{-4}$ gram atom per gram mole of zinc sulfide matrix formed during firing, lithium in compound form substantially free from halogen having been included in the raw mix for said phosphor in amount of from $1 \times 10^{-4}$ to $1 \times 10^{-2}$ gram atom per gram mole of zinc sulfide matrix formed during firing, and titanium present in said phosphor in amount of from $1 \times 10^{-6}$ to $1 \times 10^{-4}$ gram atom per gram mole of the zinc sulfide matrix.

4. A photoluminescent phosphor composition having a zinc sulfide matrix and activated by copper, lithium, and titanium in activator proportions, and substantially free from any halogen and any Group IIIA element, copper in compound form substantially free from halogen having been included in the raw mix for said phosphor in amount of from $5 \times 10^{-6}$ to $1 \times 10^{-4}$ gram atom per gram mole of zinc sulfide matrix formed during firing, lithium in compound form substantially free from halogen having been included in the raw mix for said phosphor in amount of from $1 \times 10^{-3}$ to $3 \times 10^{-3}$ gram atom per gram mole of zinc sulfide matrix formed during firing, and titanium present in said phosphor in amount of from $1 \times 10^{-5}$ to $3 \times 10^{-5}$ gram atom per gram mole of the zinc sulfide matrix.

5. An electroluminescent phosphor composition having a matrix consisting essentially of zinc sulfide and including copper, lithium, and titanium in activator proportions, and substantially free from any halogen and any Group IIIA element, copper in compound form substantially free from halogen having been included in the raw mix for said phosphor in amount of from $1 \times 10^{-4}$ to $1 \times 10^{-2}$ gram atom per gram mole of zinc sulfide matrix formed during firing, lithium in compound form substantially free from halogen having been included in the raw mix for said phosphor in amount of from $1 \times 10^{-4}$ to $1 \times 10^{-2}$ gram atom per gram mole of zinc sulfide matrix formed during firing, and titanium present in said phosphor in amount of from $1 \times 10^{-4}$ to $1 \times 10^{-2}$ gram atom per gram mole of the zinc sulfide matrix.

6. An electroluminescent phosphor composition having a zinc sulfide matrix and activated by copper, lithium, and titanium, and substantially free from any halogen and any Group IIIA element, copper in compound form substantially free from halogen having been included in the raw mix for said phosphor in amount of from $1 \times 10^{-4}$ to $1 \times 10^{-2}$ gram atom per gram mole of zinc sulfide matrix formed during firing, lithium in compound form substantially free from halogen having been included in the raw mix for said phosphor in amount of from $1 \times 10^{-4}$ to $1 \times 10^{-2}$ gram atom per gram mole of zinc sulfide matrix formed during firing, and titanium present in said phosphor in amount of from $1 \times 10^{-4}$ to $1 \times 10^{-2}$ gram atom per gram mole of the zinc sulfide matrix.

7. The phosphor composition as specified in claim 6, wherein lanthanum is included in the phosphor in amount from $1 \times 10^{-4}$ to $1 \times 10^{-2}$ gram atom per gram mole of zinc sulfide matrix.

8. An electroluminescent phosphor composition having a zinc sulfide matrix and activated by copper, lithium, and titanium, and substantially free from any halogen and any Group IIIA element, copper in compound form substantially free from halogen having been included in the raw mix for said phosphor in amount of from $2 \times 10^{-3}$ to $7 \times 10^{-3}$ gram atom per gram mole of zinc sulfide matrix formed during firing, lithium in compound form substantially free from halogen having been included in the raw mix for said phosphor in amount of from $1\times10^{-3}$ to $3\times10^{-3}$ gram atom per gram mole of zinc sulfide matrix formed during firing, and titanium present in said phosphor in amount of from $3\times10^{-3}$ to $7\times10^{-3}$ gram atom per gram mole of the zinc sulfide matrix.

9. The phosphor composition as specified in claim 8, wherein lanthanum is included in the phosphor in amount of about $1\times10^{-3}$ gram atom per gram mole of zinc sulfide matrix formed during firing.

References Cited by the Examiner

UNITED STATES PATENTS

| 2,447,322 | 8/1948 | Fonda | 252—301.6 |
| 2,798,854 | 7/1957 | Froelich | 252—301.6 |

FOREIGN PATENTS

| 201,462 | 4/1956 | Australia. |

TOBIAS E. LEVOW, *Primary Examiner.*

MAURICE BRINDISI, *Examiner.*

R. D. EDMONDS, *Assistant Examiner.*